United States Patent

Farwaha et al.

Patent Number: 5,455,298
Date of Patent: Oct. 3, 1995

[54] LATEX POLYMERS FOR PIGMENTS COATINGS PREPARED IN THE PRESENCE OF ACETOACETONATE MOIETY

[75] Inventors: Rajeev Farwaha, Brampton; Lien Phan, Mississauga; William Currie, Elmira, all of Canada

[73] Assignee: National Starch and Chemical Investment Holding Corporation, Wilmington, Del.

[21] Appl. No.: 281,388

[22] Filed: Jul. 27, 1994

[51] Int. Cl.⁶ .................................................. C08F 8/00
[52] U.S. Cl. ........................... 524/612; 525/386; 528/392
[58] Field of Search ........................... 524/612; 525/386; 528/392

[56] References Cited

U.S. PATENT DOCUMENTS

| | | | |
|---|---|---|---|
| 3,554,987 | 1/1971 | Smith | 260/79.3 |
| 4,408,018 | 10/1983 | Bartman et al. | 525/300 |
| 4,906,684 | 3/1990 | Say | 524/548 |

*Primary Examiner*—Edward Cain
*Attorney, Agent, or Firm*—William K. Wissing

[57] ABSTRACT

The invention relates to an acrylic polymer latex comprising the polymerization product of an acetoacetate moiety of the structure

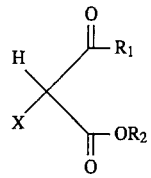

wherein $R_1$ and $R_2$ are the same or different and are selected from the group consisting of $C_1$–$C_{22}$ alkyl groups and X is a halogen, in amounts effective to improve the water resistance of the acrylic latex; and at least one monomer(s) selected from the group consisting of $C_3$–$C_6$ monocarboxylic acids, $C_4$–$C_6$ dicarboxylic acids and their $C_1$–$C_4$ half esters, $C_1$–$C_{10}$ alkyl esters of acrylic acid, $C_1C_{10}$ alkyl esters of methacrylic acid, styrene, halogenated styrene and substituted styrene and latex compositions containing the novel latexes. The invention also relates to methods of improving the water resistance of the coating compositions which include adding to the coating composition the latex which contains an amount of the acetoacetate moiety effective to improve the water resistance of the coating compositions.

10 Claims, No Drawings

LATEX POLYMERS FOR PIGMENTS COATINGS PREPARED IN THE PRESENCE OF ACETOACETONATE MOIETY

FIELD OF THE INVENTION

The invention relates to novel all-acrylic and styrene-acrylic emulsion polymers, solvent-free coatings containing the polymers and processes for preparing the polymers.

BACKGROUND OF THE INVENTION

Latex-based paints have captured a significant portion of the indoor and outdoor paint market as a result of the many advantages that such paints have over solvent-based products. The main advantage of latex-based paints include easy clean up, low odor and fast dry times.

The properties that are desirable in paints, namely the ability to be used at a temperature low enough for application over a long seasonal range, to withstand repeated cycles of freezing and thawing, and to form a film hard enough to avoid tackiness, blocking and dirt pickup in the intended application, are enhanced in latex based formulations by the addition of coalescing solvents and anti-freeze agents. These coalescing solvents (for example, butyl carbitol acetate) and anti-freeze agents (for example propylene glycol, ethylene glycol) are volatile organic compounds that are present in amounts up to 360g per liter of paint (3 lbs. per gallon), not including water.

Coalescing solvents are needed because the polymers used in latex paints must have the lowest possible minimum film forming temperature (MFFT) and the highest possible glass transition temperature (Tg). The MFFT is the lowest temperature at which the polymer particles will mutually coalesce and form a continuous film when the water, which is the solvent base, evaporates. Polymers that have low MFFT extend the temperature conditions under which the paint can be applied. The Tg is the temperature at which a polymer changes from an amorphous, soft and tacky state to a glossy, hard and rigid state. Polymers with high Tg values will result in a paint coating that will be hard, resistant to abrasion and resistant to blocking. Coalescing solvents effectively lower the Tg of the polymer to meet the desired low MFFT on application, and then eventually diffuse out of the paint and evaporate, leaving a high Tg film. Antifreeze agents are added to paint formulations simply to impart freeze-thaw stability.

In U.S. Pat. No. 4,906,684, ambient curing coatings which contain an acetoacetoxy group (obtained via copolymerizing unsaturated acetoacetoxy groups), a glycidyl group and a carboxylic acid group are disclosed. Also disclosed are film forming acrylic polymers which contain pendant acetoacetoxy groups, glycidyl groups and carboxylic acid groups.

In U.S. Pat. No. 4,408,018, polymers containing pendant acetoacetate moieties are mixed with polyacrylates which contain more than one unsaturated acrylic group and cured through Michael addition using a strong base as catalyst.

Coating compositions which cure under ambient conditions have been known for a long time. The earliest of such coating compositions are coatings based on drying oils (alkyds) which cure under auto oxidation. Other coating compositions which have been developed more recently, are those based on the epoxide-carboxylic acid reaction, isocyanate-moisture reactions, polyaziridine-carboxylic acid reaction, and activated methylene reactions.

With the universal recognition that volatile organic compounds are detrimental to the environment, there is a need for latex-based paints that contain no coalescing solvents or anti-freeze agents. Considerable research continues in an effort to create solvent-free coating systems with superior abrasion properties. Soft binders designed for solvent-free systems exhibit poor abrasion properties when compared to hard binders intended for use with fugitive coalescents. There is an urgent need to design latices for VOC free coatings exhibiting abrasion properties comparable to solvented, water-based systems. The present invention thus provides certain compounds which have been found to serve as reactive materials in latex compositions for enhancing abrasion resistance in formulated pigmented coating systems without adding to the volatile organic compound content.

SUMMARY OF THE INVENTION

The invention relates to an acrylic polymer latex comprising the polymerization product of an acetoacetate moiety of the structure

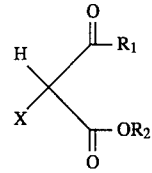

wherein $R_1$ and $R_2$ are $C_1$–$C_{22}$ alkyl groups and X is a halogen, in amounts effective to improve the water resistance of the acrylic latex, and at least one monomer(s) selected from the group consisting of $C_3$–$C_6$ monocarboxylic acids, $C_4$–$C_6$ dicarboxylic acids and their $C_1$–$C_4$ half esters, $C_1$–$C_{10}$ alkyl esters of acrylic acid, $C_1C_{10}$ alkyl esters of methacrylic acid and styrene and latex compositions containing the novel latexes. The invention also relates to methods of improving the water resistance of the coating compositions which include adding to the coating composition the latex which contains an amount of the acetoacetate group effective to improve the water resistance of the coating compositions.

DETAILED DESCRIPTION OF THE INVENTION

The acrylic polymers of the latexes of this invention are broadly characterized as styreneacrylic and all-acrylic copolymers that incorporate acetoacetate moieties of the following general structure.

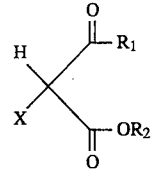

wherein $R_1$ and $R_2$ are the same or different and are selected from the group consisting of $C_1$–$C_{22}$ alkyl groups and X is a halogen. In preferred embodiments $R_1$ is $CH_3$.

The incorporation of such acetoacetate moieties into the polymer imparts water resistance to the coatings. The acetoacetate moiety will be polymerized into the polymer in amounts from 0.5 to 2 parts per hundred parts by weight of monomers. A preferred acetoacetate moiety includes ethyl 2-chloroacetoacetate. This monomeric compound can be purchased from Siiurefabrick of Switzerland and distributed in North America by Lonza Inc.

The polymers are prepared either as acrylic homopolymers or as styrene-acrylic copolymers. The particular choice and weight ratio of monomers will depend on the desired Tg range for the polymer, which can be calculated using the Fox equation:

$$1/Tg(polymer)=W_{(a)}/Tg_{(a)}+W_{(b)}/Tg_{(b)}+\ldots,$$

where $W_{(a)}$ and $W_{(b)}$ are the weight fractions of comonomers (a) and (b) and $Tg_{(a)}$ and $Tg_{(b)}$ are the glass transition temperatures for homopolymers (a) and (b), respectively. Glass transition temperatures for various homopolymers are available in many literature sources, including J. Brandup and E. H. Immergut, *Polymer Handbook,* 2nd ed., John Wiley & Sons, N.Y., pp 139–192 (1975). These functional monomers enhance the binding capacity of polymer particles in a highly filled (pigment loaded) coating composition, and also enhance the mechanical stability and colloidal stability of the latex particles. Examples of suitable carboxylic acid monomers are the $C_3-C_6$ monocarboxylic acids, such as, methacrylic acid, acrylic acid, mono-methylmaleate, and mono-ethylmaleate, and $C_4-C_6$ dicarboxylic acids, such as fumaric acid, maleic acid, and itaconic acid, and their $C_1-C_4$ half esters.

When the carboxylic acid monomers are employed, they are present in amounts between 1 to 3 parts per hundred parts by weight of monomer, preferably between 0.5 to 1 parts per hundred parts by weight of monomer. Other monomers which may be used in preparing the novel latexes are $C_1-C_{10}$ alkyl esters of acrylic acid, $C_1-C_{10}$ alkyl esters of methacrylic, styrene halogenated styrene and substituted styrene. Preferred monomers are ethyl acrylate, butyl acrylate, 2-ethylhexyl acrylate, lauryl (meth)acrylate, decyl (meth)acrylate, steryl (meth)acrylate, methyl methacrylate, butyl methacrylate, styrene, halogenated styrene and substituted styrenes.

In order to optimize the wet adhesion of the ultimate paint formulation, polymer domains, may comprise a wet adhesion monomer, or a combination of wet adhesion monomers. These monomers are well known in the art and include aminoethyl acrylate and methacrylate, dimethylaminopropyl acrylate and methacrylate, 3-dimethylamino-2, 2-dimethyl-propyl-1-acrylate and methacrylate, 2-N-morpholinoethyl acrylate and mrthacrylate, 2-N-piperidinoethyl acrylate and methacrylate, N-(3-dimethylaminopropyl) acrylamide and methacrylamide, N-(3-dimethylamino-2, 2-dimethylpropyl) acrylamide and methacrylamide, N-dimethylaminomethyl acrylamide and methacrylamide, N-dimethylaminomethyl acrylamide and methacrylamide, N-(4-morpholino-methyl) acrylamide and methacrylamide, vinylimidazole, vinylpyrrolidone, N-(2-methacryloyloxyethyl) ethylene urea, N-(2-methacryloxyacetamidoethyl)-N, N'-ethyleneurea, allylalky ethylene urea, N-methacrylamidomethyl urea, N-methacryoyl urea, N-[3-( 1,3-diazacryclohexan)-2-on-propyl]methyacrylamide, 2-(1-imidazolyl) ethyl methacrylate, 2-(1-imidazolidin-2-on)ethylmethacrylate, N-(methacrylamido)ethyl urea (DV2422, Rhone Poulenc) and allyl ureido wet adhesion monomer (Sipomer WAM®, Rhone Poulenc). The wet adhesion monomers will be present in an amount from 0.2% to 2.0% by weight of the total polymer.

The polymerization of the polymer can be accomplished by known procedures for polymerization in aqueous emulsion. Optionally, conventional seeding procedures can be employed to aid in controlling polymerization to achieve the desired average particle size and particle size distribution. If seeding is employed, the polymer seed will be present in amounts that correspond to about 0.1% to 8% by weight of the total polymer, and will range in size from about 20% to 60% of the diameter of the polymer particles to be formed.

The seed latex can constitute a previously prepared latex or polymer powder, or it can be prepared in situ. The monomeric composition of the seed latex can vary; however, it is preferable that it be substantially the same as that of the polymer.

The monomer or comonomers and, optionally, the seed to be employed in the preparation of the polymer, are dispersed into water with agitation sufficient to emulsify the mixture. The aqueous medium may also contain a free radical polymerization catalyst, an emulsifying agent (i.e., surfactant), or other ingredients that are known and conventionally employed in the art as emulsion polymerization aids.

Suitable free radical polymerization catalysts are the catalysts known to promote emulsion polymerization and include water-soluble oxidizing agents, such as, organic peroxides (e.g., t-butyl hydroperoxide, cumene hydroperoxide, etc.), inorganic oxidizing agents (e.g., hydrogen peroxide, potassium persulfate, sodium persulfate, ammonium persulfate, etc.) and those catalysts that are activated in the water phase by a water-soluble reducing agent. Such catalysts are employed in a catalytic amount sufficient to cause polymerization. As a general rule, a catalytic amount ranges from about 0.1 to 5 parts per hundred parts by weight of monomer. As alternatives to heat or catalytic compounds to activate the polymerization, other free radical producing means, such as exposure to activating radiation, can be employed.

Suitable emulsifying agents include anionic, cationic, and nonionic emulsifiers customarily used in emulsion polymerization. Usually, at least one anionic emulsifier is utilized and one or more nonionic emulsifiers may also be utilized. Representative anionic emulsifiers are the alkyl aryl sulfonates, alkali metal alkyl sulfates, the sulfonated alkyl esters, and fatty acid soaps. Specific examples include sodium dodecylbenzene sulfonate, sodium butylnaphthalene sulfonate, sodium lauryl sulfate, disodium dodecyl diphenyl ether disulfonate, N-octadecyl disodium sulfosuccinate and dioctyl sodium sulfosuccinate. The emulsifying agents are employed in amounts to achieve adequate emulsification and to provide desired particle size and particle size distribution.

Other ingredients known in the art to be useful for various specific purposes in emulsion polymerization, such as, acids, salts, chain transfer agents, and chelating agents, can also be employed in the preparation of the polymer. For example, if the polymerizable constituents include a monoethylenically unsaturated carboxylic acid comonomer, polymerization under acidic conditions (pH 2 to 7, preferably 2 to 5) is preferred. In such instances, the aqueous medium can include those known weak acids and their salts that are commonly used to provide a buffered system at the desired pH range.

The manner of combining the polymerization ingredients can be by various known monomer feed methods, such as, continuous monomer addition, incremental monomer addition, or addition in a single charge of the entire amount of monomers. The entire amount of the aqueous medium with polymerization additives can be present in the polymerization vessel before introduction of the monomers, or alternatively, the aqueous medium, or a portion of it, can be added continuously or incrementally during the course of the polymerization.

Polymerization is initiated by heating the emulsified mixture with continued agitation to a temperature usually between about 50° to 100°, preferably between 60° to 100° C. Polymerization is continued by maintaining the emulsified mixture at the selected temperature until conversion of the monomer or monomers to polymer has been reached.

Following polymerization, the solids content of the resulting aqueous heterogeneous polymer latex can be adjusted to the level desired by the addition of water or by the removal of water by distillation. Generally, the desired level of polymeric solids content is from about 20 to 60% by weight on a total weight basis.

The size of the polymer particles can vary; however, for optimum water resistant, it is preferable that the particles have an average diameter of less than 500 nanometers. In general, for the polymer of this invention, the smaller the average particle size, the more water resistant the polymer. Suitable particle sizes generally can be achieved directly from the polymerization. However, screening of the resulting latex to remove particles outside the desired size range, and thus narrowing the particle size distribution, may be employed.

For various applications, it is sometimes desirable to have small amounts of additives, such as, surfactants, bactericides (e.g., formaldehyde), pH modifiers, and antifoamers, incorporated in the latex, and this may be done in a conventional manner and at any convenient point in the preparation of the latexes.

EXAMPLE I

A series of all-acrylic polymer latexes using an anionic surfactant, Sipex EST-30 (a product of Rhône Poulenc), and a non-ionic surfactant, Rexol 25/307 (a product of Huntsman Corporation) were prepared according to the following procedure:

| Compound | Grams | Conc in pphm[a] |
|---|---|---|
| Initial Charge | | |
| Water | 352 | 46.3 |
| Sipex EST-30 | 2.0 | 0.26 |
| Rexol 25/307 | 2.8 | 0.37 |
| Monomer Mix | | |
| Water | 260.5 | 34.2 |
| Sipex EST-30 | 64.3 | 8.45 |
| Rexol 25/307 | 1.2 | 0.16 |
| Methacrylic Acid | 5.6 | 0.75 |
| Sipomer WAM II | 11.1 | 1.46 |
| BA | 434 | 57 |
| MMA | 327 | 43 |
| Adjust pH to 5 to 7 with NH$_4$OH | | |
| Catalyst Solution | | |
| Water | 6.7 | 8.8 |
| Ammonium Persulfate | 3.4 | 0.52 |

[a]In parts per hundred parts by weight of monomers

In a 3 liter vessel, equipped with a reflux condenser, addition funnels, and stirrer, an initial charge of water, anionic and non-ionic surfactant and defoamer, was mildly agitated and heated to 78° C. A 52.0 gm portion of the monomer mix and 8.0 gm of the catalyst solution were then charged to the reaction vessel and the reaction mix held for 20 minutes at the same temperature. The remainder of the first-stage monomer mix was metered into the reaction over the course of 4 hours.

The catalyst solution was delivered to the reactor over a period of 4.5 hours and the reaction allowed to proceed to completion. The reaction was then held for 10 minutes at 78° C., and allowed to cool to room temperature. As the reaction mixture was cooling, 0.5 gm of tertiary butyl hydroperoxide and 0.2 gm sodium formaldehyde sulfoxylate were added when the temperature reached 65° C. The pH of the resultant latex was adjusted to between 7 to 8 by the addition of 26.6% aqueous ammonium hydroxide solution.

The resulting control polymer latex was designated 1A and had the following physical properties: 50.3% solids; 140 nm Ps; 7.5 pH; MFFT of −0.8 to 0° C.

A second all-acrylic latex employing ethyl 2-chloroacetoacetate at 0.5 part per hundred parts by weight of monomer was prepared following the procedure described for 1A. The polymer latex was designated 1B, and exhibited the following physical properties: 50.4% solids; 133 nm PS; 7.5 pH; MFFT of −0.5 to 0° C.

A third all-acrylic latex employing ethyl 2-chloroacetoacetate at 1.0 part per hundred parts by weight of monomer was synthesized. The latex was designated 1C and exhibited the following physical properties: 50.5% solids; 137 nm Ps; 7.5 pH; MFFT of −0.9 to 0° C.

As a comparative example, ethyl acetoacetate was introduced at 1.0 part per hundred parts by weight of monomer in the SA of Example I. The latex was designated 1D and had the following physical properties: 50.5% solids; 7.5 pH; PS 138 nm; MFFT of −0.8 to 0° C.

EXAMPLE II

This following is the paint formulation in which the latexes of Example I were evaluated.

| Semi-gloss Solvent-Free Paint Formula | |
|---|---|
| Ingredients | Grams |
| Water | 210.0 |
| BYK156 | 5.0 |
| BYK301 | 4.0 |
| BYK034 | 2.0 |
| Natrosol 250 HR | 1.0 |
| Caustic Potash (45%) | 4.0 |
| Titanox 2020 | 300.0 |
| ASP-170 | 50.0 |
| Polyphobe 102 | 6.3 |
| BYK034 | 0.6 |
| Disperse 5 - 6 Hegman | |
| Water | 140.6 |
| Rexol 25/407 | 40.0 |
| Resyn ™ (50% solids) polymer emulsion | 654.6 |
| Polyphobe 102 | 8.5 |
| Kathon LX | 0.6 |
| BYK034 | 0.8 |
| | 1392.0 |

% PVC = 25.22
Weight Solids = 49.84
Volume Solids = 35.96
Density = 12.83 lb/gal.
VOC = 0

| Ingredient | Source |
|---|---|
| 1) BYK156 Dispersant is a proprietary mixture. | BYK Chemie |
| 2) BYK034 Defoamer is a proprietary mixture. | BYK Chemie |
| 3) BYK301 | BYK Chemie |
| 4) Natrosol 250 HR is hydroxy ethyl cellulose. | Aqualon |

| | Company |
|---|---|
| 5) Titanox 2020 is a rutile titanium dioxide. | Tioxide, Inc. |
| 6) ASP-170 is an aluminum silicate pigment. | Engelhard Corporation |
| 7) Polyphobe is an associative thickener. | Union Carbide |
| 8) Rexol 25/407 is a non-ionic surfactant. | Huntsman Corporation |
| 9) Kathon LX is a microbiocide. | Rohm & Haas |
| 10) Resyn is a polymer emulsion. | National Starch and Chemical Company |

The polymer latexes of Example I were formulated into the semi-gloss formula of Example II and analyzed for abrasion, wet adhesion and low temperature film formation according to the following test protocol.

Low Temperature Film Formation

The paint was conditioned in a 2° to 5° C. refrigerator for 1 hour, and a 3 mil film of the paint then applied over a 19 BR leneta chart. The film was allowed to dry overnight at 2° to 5° C. and visually examined for signs of cracking. A paint was deemed to form film acceptably when no difference could be seen between the film applied at 5° C. and a film applied at room temperature (22° C.).

Wet Adhesion

Scrub panels were prepared by drawing down a semi-gloss alkyd base (chosen as being the most difficult test for wet adhesion) into a 3 mil film onto a leneta chart° The charts were aged at least one week at room temperature. The test paints were then drawn down into a 3 mil film onto the aged alkyd surface and allowed to dry for 7 days. The dried charts were scored, affixed to glass panels and put into a scrub machine equipped with a scrub brush and a basin for holding the test panel. The brush was conditioned by immersing it in warm water for 30 minutes and then placed in the machine holder. The test panel was placed in the basin under the brush and 200 gm of warm (50° C.) water was added to the basin. The scrub machine was started and run for 400 strokes.

If the coating remained intact, 8 gm of a dry abrasive (Ajax®) was placed under the brush and the machine run for another 100 strokes. The last step was repeated until the coating failed, that is, when the test paint stripped from the alkyd base. The number of strokes to failure was recorded.

Abrasion Resistance (Scrubability)

A test scrub was prepared by drawing down a 3 mil film of the respective test paints on a leneta chart and allowing the paint to dry 7 days. The dried chart was affixed to a glass panel and put into a scrub machine equipped with a scrub brush and a basin for holding the test panel. The brush was prepared by immersing it in plain water for 30 minutes. The brush was placed in the machine holder and the test scrub panel was put under the brush. The scrub machine was started and the panel kept wet with the scrubbing solution standardized scrub medium—ASTM method D2486. The number of strokes to the point at which a ½" of black chart shows through the test panel was recorded.

| Latex | 1A | 1B | 1C | 1D |
|---|---|---|---|---|
| Paint Properties: | | | | |
| Abrasion (ASTM D2486) (strokes to failure) | 756 | 1290 | 1716 | 710 |
| Wet Adhesion (strokes) | 2500 | 2100 | 2000 | 2400 |
| Gloss (60°) after 48 hours | 55.9 | 60.2 | 58.0 | 52.4 |
| Low Temp. Film-formation | v smooth | smooth | smooth | smooth |
| Contrast Ratio | 0.967 | 0.966 | 0.978 | 0.960 |

The above results show that an increase in abrasion resistance occurs by incorporating ethyl 2-chloroacetoacetate. The results also prove the importance of labile hydrogen in ethyl 2-chloroacetoacetate for chain transferring of acetoacetate moiety and incorporation on polymer particle versus ethyl acetoacetate of Example 1 D.

We claim:

1. An acrylic polymer latex comprising the polymerization product of an acetoacetate moiety of the structure

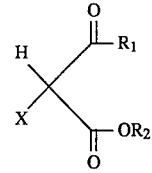

wherein $R_1$ and $R_2$ are the same or different and are selected from the group consisting of $C_1$–$C_{22}$ alkyl groups and X is a halogen, in amounts effective to improve the water resistance of the acrylic latex; and at least one monomer(s) selected from the group consisting of $C_3$–$C_6$ monocarboxylic acids, $C_4$–$C_6$ dicarboxylic acids and their $C_1$–$C_4$ half esters, $C_1$–$C_{10}$ alkyl esters of acrylic acid, $C_1C_{10}$ alkyl esters of methacrylic acid and styrene.

2. The latex of claim 1 comprising from 0.5 to 2 parts of said acetoacetate moiety per hundred parts by weight of monomer(s).

3. The latex of claim 2 wherein the acetoacetate moiety is ethyl 2-chloroacetoacetate.

4. The latex of claim 3 wherein the monomer(s) is selected from the group consisting of acrylic acid, methacrylic acid, ethyl acrylate, butyl acrylate, 2-ethylhexyl acrylate, lauryl (meth)acrylate, decyl (meth)acrylate, steryl (meth)acrylate, methyl methacrylate, butyl methacrylate, styrene, halogenated styrene and substituted styrenes.

5. The latex of claim 4 further comprising a wet adhesion monomer.

6. A latex-based coating composition comprising an acrylic polymer latex which is the polymerization product of an acetoacetate moiety of the structure

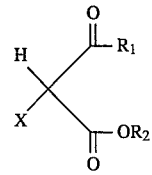

wherein $R_1$ and $R_2$ are the same or different and are selected from the group consisting of $C_1$–$C_{22}$ alkyl groups and X is a halogen; and at least one monomer(s) selected from the group consisting of $C_3$–$C_6$ monocarboxylic acids, $C_4$–$C_6$ dicarboxylic acids and their $C_1$–$C_4$ half esters, $C_1$–$C_{10}$ alkyl esters of acrylic acid, $C_1C_{10}$ alkyl esters of methacrylic acid, styrene, halogenated styrene and substituted styrene, the acetoacetate moiety being present in amounts effective to improve the water resistance of the coating composition.

7. The composition of claim 6 comprising from 0.5 to 2 parts of said acetoacetate moiety per hundred parts by weight of monomer(s).

8. The latex of claim 7 wherein the acetoacetate moiety is ethyl 2-chloroacetoacetate.

9. The latex of claim 8 wherein the monomer(s) is selected from the group consisting of acrylic acid, methacrylic acid, ethyl acrylate, butyl acrylate, 2-ethylhexyl acrylate, lauryl (meth)acrylate, decyl (meth)acrylate, steryl (meth)acrylate, methyl methacrylate, butyl methacrylate, styrene, halogenated styrene and substituted styrenes.

10. A method for improving the water resistance of a latex-based coating composition, comprising adding thereto an acrylic polymer latex comprising the polymerization product of an acetoacetate moiety of the structure

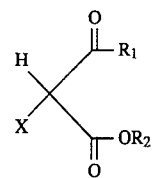

wherein $R_1$ and $R_2$ are the same or different and are selected from the group consisting of $C_1$–$C_{22}$ alkyl groups and X is a halogen; and at least one monomer(s) selected from the group consisting of $C_3$–$C_6$ monocarboxylic acids, $C_4$–$C_6$ dicarboxylic acids and their $C_1$–$C_4$ half esters, $C_1$–$C_{10}$ alkyl esters of acrylic acid, $C_1C_{10}$ alkyl esters of methacrylic acid, styrene, halogenated styrene and substituted styrene, the acetoacetate moiety being present in amounts effective to improve the water resistance of the coating composition.

* * * * *